United States Patent
Sakayori

(10) Patent No.: US 11,703,007 B2
(45) Date of Patent: Jul. 18, 2023

(54) CONTROL METHOD OF ENGINE SYSTEM, AND ENGINE SYSTEM

(71) Applicant: NISSAN MOTOR CO., LTD., Yokohama (JP)

(72) Inventor: Yousuke Sakayori, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/606,160

(22) PCT Filed: Apr. 26, 2019

(86) PCT No.: PCT/JP2019/018035
§ 371 (c)(1),
(2) Date: Oct. 25, 2021

(87) PCT Pub. No.: WO2020/217484
PCT Pub. Date: Oct. 29, 2020

(65) Prior Publication Data
US 2022/0243675 A1 Aug. 4, 2022

(51) Int. Cl.
*F02D 41/14* (2006.01)
*F02D 41/38* (2006.01)

(52) U.S. Cl.
CPC ......... *F02D 41/1454* (2013.01); *F02D 41/38* (2013.01)

(58) Field of Classification Search
CPC .. F02D 41/1454; F02D 41/38; F02D 41/1481; F02D 2041/281; F02D 41/1456;
(Continued)

(56) References Cited

U.S. PATENT DOCUMENTS

| 9,757,254 B2 * | 9/2017 | Nagarajan | B25J 9/0006 |
| 2016/0061131 A1 * | 3/2016 | Santillo | F01N 3/101 60/285 |

(Continued)

FOREIGN PATENT DOCUMENTS

| JP | 5-300371 A | 11/1993 |
| JP | 6-50204 A | 2/1994 |

(Continued)

*Primary Examiner* — Joseph J Dallo
(74) *Attorney, Agent, or Firm* — Foley & Lardner LLP

(57) ABSTRACT

A control method of an engine system is a method of controlling the engine system including an engine with a combustion chamber; a fuel injection valve configured to supply fuel to the engine; and an air-fuel ratio sensor provided in a flow path of exhaust gas from the engine. In the control method, feedback control is performed so that an air-fuel ratio in the combustion chamber becomes a target value by controlling the fuel injection valve, using an air-fuel ratio measured value obtained by the air-fuel ratio sensor. In the feedback control, a transfer function is used, the transfer function being obtained by system identification of a plant having the air-fuel ratio in the combustion chamber serve as an input and the air-fuel ratio measured value obtained by the air-fuel ratio sensor serve as an output. In the control method, a filtering process is performed to an air-fuel ratio measured value used in the feedback control, the filtering process cutting a component having a response speed faster than a delay indicated by the transfer function.

3 Claims, 5 Drawing Sheets

(58) Field of Classification Search
CPC ............... F02D 41/1477; F02D 41/18; F02D 2041/1422; F02D 2041/1423; F02D 2041/1432

See application file for complete search history.

(56) References Cited

U.S. PATENT DOCUMENTS

2017/0089280 A1\* 3/2017 Santillo ............... F02D 41/2461
2018/0367067 A1\* 12/2018 Yang .................... H02K 41/031

FOREIGN PATENT DOCUMENTS

| JP | 2004-360591 A | 12/2004 |
| JP | 2005-42788 A | 2/2005 |
| JP | 2006-233973 A | 9/2006 |
| JP | 2010-19106 A | 1/2010 |

\* cited by examiner

CONTROL METHOD OF ENGINE SYSTEM, AND ENGINE SYSTEM

TECHNICAL FIELD

The present invention relates to a control method of an engine system, and an engine system.

BACKGROUND ART

In an internal combustion engine, an air-fuel ratio in a combustion chamber is feedback controlled by measuring the air-fuel ratio (mass ratio of air to fuel) of exhaust gas by using an air-fuel ratio sensor provided in an exhaust gas flow path communicating with the combustion chamber, and a fuel supplied amount to the combustion chamber is changed in response to an air-fuel ratio measured value. By feedback controlling the air-fuel ratio as such, it is possible to combust the fuel in the combustion chamber at any air-fuel ratio.

At the same time, the air-fuel ratio measured value measured by the air-fuel ratio sensor is used for diagnosing whether or not the fuel is combusting normally in the combustion chamber. In response to the recent increase in consciousness against environmental issues, there is a high demand for immediacy in the diagnosis of the combustion state, and an air-fuel ratio sensor with high responsiveness is used. However, as the responsiveness of the air-fuel ratio sensor increases, there is a higher possibility of noise inclusion in the air-fuel ratio measured value. Furthermore, if feedback control of the air-fuel ratio is performed using the air-fuel ratio measured value that includes the noise, the noise becomes amplified, which may cause instability in the feedback control of the air-fuel ratio in the combustion chamber.

Accordingly, the air-fuel ratio measured value of the air-fuel ratio sensor is used for the diagnosis of the combustion state as it is, and remove the noise by performing a filtering process. The air-fuel ratio measured value with the noise removed is used in controlling the air-fuel ratio in the combustion chamber. The filtering process holds down the noise included in the air-fuel ratio (JPH6-50204A).

SUMMARY OF INVENTION

A filter used in the filtering process with respect to the air-fuel ratio measured value may be configured by weighted mean in response to a plurality of parameters. Such filters are optimized by changing a plurality of parameters within the filter such as an attenuation factor and comparing the outputted results from the filter for each parameter. Therefore, there is the need to evaluate a plurality of the filters in response to the parameters, which generated an issue that adaptation manhours increase.

An object of the present invention is to provide a control method of an engine system and an engine system that accomplishes a filter used in a filtering process with respect to an air-fuel ratio measured value by a method including a small number of adaptation manhours.

According to one embodiment of the present invention, a control method of an engine system is a method of controlling the engine system including an engine with a combustion chamber; a fuel injection valve configured to supply fuel to the engine; and an air-fuel ratio sensor provided in a flow path of exhaust gas from the engine. In the control method, feedback control is performed so that an air-fuel ratio in the combustion chamber becomes a target value by controlling the fuel injection valve, using an air-fuel ratio measured value obtained by the air-fuel ratio sensor. In the feedback control, a transfer function is used, the transfer function being obtained by system identification of a plant having the air-fuel ratio in the combustion chamber serve as an input and the air-fuel ratio measured value obtained by the air-fuel ratio sensor serve as an output. In the control method, a filtering process is performed to an air-fuel ratio measured value used in the feedback control, the filtering process cutting a component having a response speed faster than a delay indicated by the transfer function.

DESCRIPTION OF EMBODIMENTS

An embodiment of the present invention will be described below with reference to the drawings.

Figure 1:
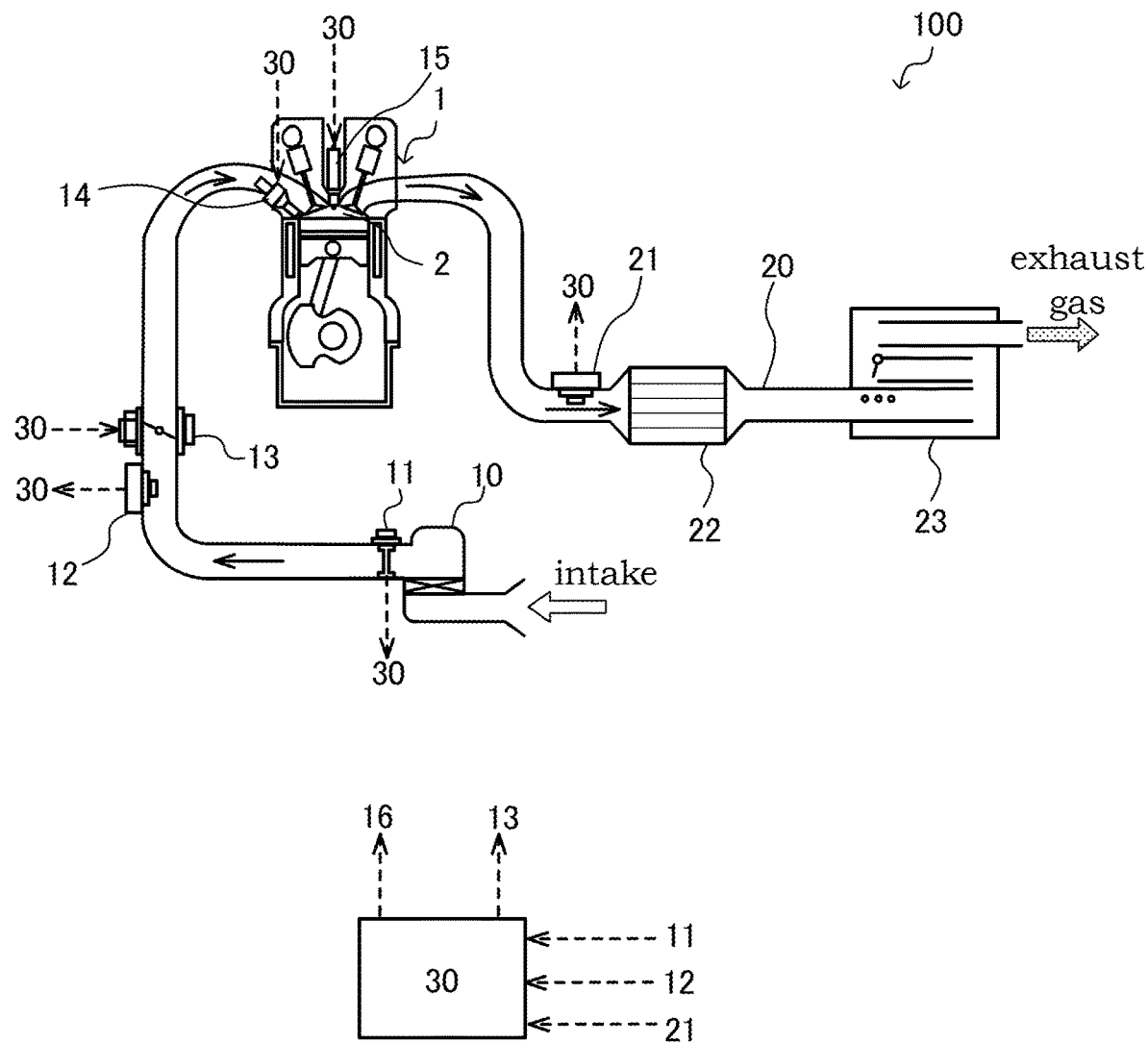
FIG. 1 is a schematic diagram of an engine system of the present embodiment.

FIG. 1 is a schematic diagram of an engine system 100 according to the present embodiment. This engine system 100 is installed on a vehicle; the engine system 100 is equipped with an engine 1 being an internal combustion engine, an intake passage 10 that sends intake to the engine 1, and an exhaust gas passage 20 through which exhaust gas from the engine 1 passes. In addition, the entire engine system 100 is controlled by a controller 30.

The intake passage 10 is configured to supply the intake taken in from outside to the engine 1. In the intake passage 10, an air flow meter 11, a pressure sensor 12, and a throttle valve 13 are disposed in this order from an upstream side of an intake flow.

The air flow meter 11 and the pressure sensor 12 measure a flow rate and pressure of the intake in the intake passage 10, respectively, and their measurement results are outputted to the controller 30.

The throttle valve 13 is controlled by the controller 30, and an opening degree within the intake passage 10 is adjusted to adjust the intake flow rate supplied to the engine 1. The intake adjusted in the intake flow rate by the throttle valve 13 is introduced into the combustion chamber 2 of the engine 1.

The engine 1 is equipped with a fuel injection valve 14; the fuel injection valve 14 is controlled at a predetermined timing to inject fuel into the combustion chamber 2 of the engine 1, thus forming a air-fuel mixture in the combustion chamber 2. A cylinder head of the engine 1 is equipped with a spark plug 15, and this spark plug 15 is used to combust the air-fuel mixture in the combustion chamber 2. In the present embodiment, the fuel injection valve 14 is configured to inject fuel to the combustion chamber 2, however it is not limited to this. The configuration may be that the fuel injection valve 14 is equipped in the intake passage 10, the air-fuel mixture is formed in the intake passage 10 and the air-fuel mixture is supplied to the combustion chamber 2.

Burnt gas generated by combustion in the combustion chamber 2 of the engine 1 is exhausted outside via the exhaust gas passage 20. The exhaust gas passage 20 has disposed, in order from the upstream side of the exhaust gas flow, an air-fuel ratio sensor 21, a catalyst 22 that purifies the exhaust gas, and a silencer 23 that reduces the sound generated by the exhaust. The catalyst 22 is, for example a three-way catalyst or an oxidation catalyst.

The air-fuel ratio sensor 21 measures oxygen concentration in the exhaust gas, and outputs its measurement result to the controller 30. The controller 30 calculates an air-fuel ratio measured value that indicates the air-fuel ratio in the measured exhaust gas on the basis of the oxygen concentration measured by the air-fuel ratio sensor 21. As described later, the obtained air-fuel ratio measured value is used, in the controller 30, in diagnosis of a combustion state and in the control of the air-fuel ratio in the combustion chamber 2 of the engine 1.

The controller 30 receives, in addition to the intake flow rate measured by the air flow meter 11 and the air-fuel ratio measured value in the exhaust gas obtained by the air-fuel ratio sensor 21, detected values by a crank angle sensor (not illustrated), an accelerator pedal opening sensor (not illustrated) and the like. On the basis of these detected values, the controller 30 performs opening degree control of the throttle valve 13, fuel injection control using the fuel injection valve 14, ignition timing control using the spark plug 15, and the like.

The controller 30 is configured capable of executing a predetermined program, by a microcomputer including a central processing unit (CPU), a read-only memory (ROM), a random access memory (RAM), and an input-output interface (I/O interface). The controller 30 may be configured of a plurality of microcomputers.

Moreover, in the engine 1, it is preferable that the fuel and oxygen are completely combusted; hence, the controller 30 controls the amount of fuel supplied from the fuel injection valve 14 by using the air-fuel ratio measured value obtained by the air-fuel ratio sensor 21 so that the air-fuel ratio in the combustion chamber 2 of the engine 1 matches a target value. A weight ratio of the air with respect to the fuel in the engine 1 is also indicated as excess air ratio $\lambda$, and the air-fuel ratio control may be called $\lambda$ control.

Figure 2:
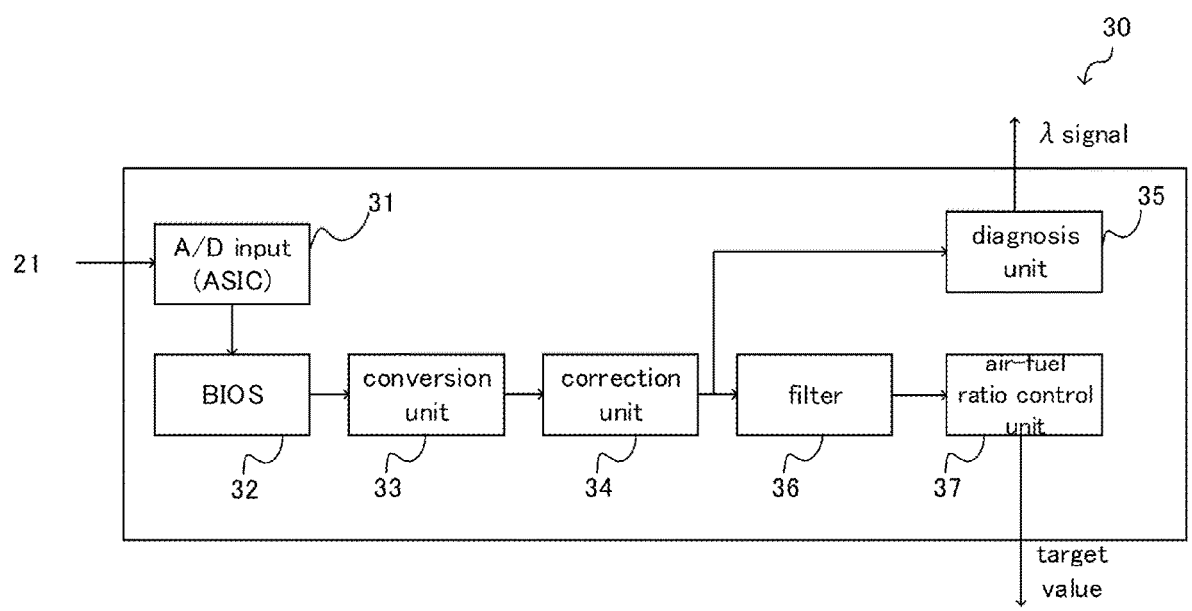
FIG. 2 is a block diagram related to a process of a detected value by an air-fuel ratio sensor.

FIG. 2 is a block diagram related to the processing of the air-fuel ratio measured value obtained by the air-fuel ratio sensor 21.

The air-fuel ratio sensor 21 is made of a metal that varies in voltage depending on the oxygen concentration, such as zirconium oxide or the like. First, an analog signal indicating a voltage to be measured by the air-fuel ratio sensor 21 is inputted to an A/D input portion 31 of the controller 30.

The A/D input portion 31 is configured by an ASIC (Application Specific Integrated Circuit), and digitally converts the inputted voltage signal and outputs the digitally converted voltage value. The voltage value outputted from the A/D input unit 31 is outputted to a conversion unit 33 via a BIOS (Basic Input Output System) 32 that controls inputs and outputs related to hardware processing in the controller 30.

The conversion unit 33 obtains the oxygen concentration corresponding to the voltage obtained by the air-fuel ratio sensor 21 by using a table stored in advance that associates the detected voltage by the air-fuel ratio sensor 21 with the oxygen concentration, and calculates the air-fuel ratio on the basis of this oxygen concentration. Furthermore, the conversion unit 33 outputs the calculated air-fuel ratio to a correction unit 34.

By using the table stored in advance, the correction unit 34 performs a predetermined correction corresponding to an exhaust gas state with respect to the air-fuel ratio obtained by the conversion unit 33, and obtains the air-fuel ratio measured value. The obtained air-fuel ratio measured value is outputted to a diagnosis unit 35, and a filter 36.

The diagnosis unit 35 determines whether or not the air-fuel ratio measured value is within a normal range. When the air-fuel ratio measured value is not within the normal range, the diagnosis unit 35 determines that the engine 1 is not operating normally and there is the possibility of misfire or the like. The controller 30 may display a warning or the like to a driver in response to a diagnosis result of the diagnosis unit 35.

On the other hand, the filter 36 removes noise that occur in the air-fuel ratio measured value, and the air-fuel ratio measured value that has undergone the filtering process is outputted to an air-fuel ratio control unit 37.

Prior to or following the filter 36, trend processing may be performed. In the trend processing, a predetermined trend value (average value) in a previous stage of the filter 36 is subtracted in advance, and a trend value is added in the subsequent stage of the filter 36. By performing such trend processing, it is possible to hold down the fluctuation of values following the filtering process in a case in which no initial value exists as like in initial startup.

The air-fuel ratio control unit 37 obtains a target value of the air-fuel ratio in the combustion chamber 2 of the engine 1 by using the air-fuel ratio measured value from which noise is removed by the filter 36, and outputs the target value to a subordinate controller (not illustrated). The subordinate controller controls the air-fuel ratio in the combustion chamber 2 by controlling the fuel injection valve 14 to achieve the target value calculated by the air-fuel ratio control unit 37.

In the air-fuel ratio control unit 37, feedback control is carried out. In general, in the feedback control, a transfer function that models a plant is obtained by system identification of the plant subject to the control, and the feedback control is performed by using the transfer function. The transfer function indicates a delay in an output with respect to an input, and hence a current state of the plant can be estimated by the output of the plant by using the transfer function. Furthermore, the plant can be controlled on the basis of the estimated state.

Moreover, in the feedback control by the air-fuel ratio control unit 37, a sliding mode control is performed. In the sliding mode control, the control subject is indicated by a state space representation, and a state variable of the control subject is restricted on a predetermined hyperplane in this state space, to control by sliding the state of the system towards an origin on the hyperplane. Such sliding mode control has high durability. Moreover, in recent years, calculation in the state space has increased in speed by calculators, and the system identification of the plant can be performed relatively easily.

As such, in the feedback control in the air-fuel ratio control unit 37, a transfer function that is obtained by the system identification of a plant having the air-fuel ratio in the combustion chamber 2 of the engine 1 serve as the input and the air-fuel ratio measured value obtained by the air-fuel ratio sensor 21 serve as the output. For example, in the air-fuel ratio control unit 37, a secondary transfer function as shown in the following formula is used.

[Math. 1]

$$G(z) = \frac{b_1 z^{-1} + b_0 z^{-2}}{1 + a_1 z^{-1} + a_0 z^{-2}} \quad (1)$$

Parameters $a_0$, $a_1$, $b_0$, and $b_1$ in Formula (1) are defined by the system identification in the plant. More specifically, the system identification in a case in which the sliding mode control is performed, a plurality of observed values of input and output in the plant is used to perform a matrix calculation using a computer, and as a result, the parameters in Formula (1) are obtained.

In the plant, a delay exists in the air-fuel ratio in the combustion chamber 2 of the engine 1 until the air-fuel ratio is obtained as the air-fuel ratio measured value by the air-fuel ratio sensor 21, and this delay can be indicated by the transfer function. Namely, the air-fuel ratio control unit 37 estimates the air-fuel ratio in the combustion chamber 2 from the air-fuel ratio measured value by using the transfer function, and on the basis of this estimated air-fuel ratio, the air-fuel ratio in the combustion chamber 2 can be controlled.

In the present embodiment, the filter 36 utilizes the transfer function shown in Formula (1) and used in the feedback control in the air-fuel ratio control unit 37. This is because, since the transfer function represents the delay in detection of the air-fuel ratio in the plant, by using the transfer function as a filter, it is possible to cut out a component with faster response speed than the delay indicated by the transfer function, namely, a high frequency component impossible to obtain by the air-fuel ratio sensor 21.

A sampling cycle of the filter 36 may be longer than the sampling cycles of the conversion unit 33 and the correction unit 34. This is because, the air-fuel ratio control unit 37 that uses the output from the filter 36 has a relatively low request for immediacy as compared to the diagnosis unit 35, and hence the sampling cycle may be made long, and also by making the sampling cycle long, more noise can be removed.

Figure 3:
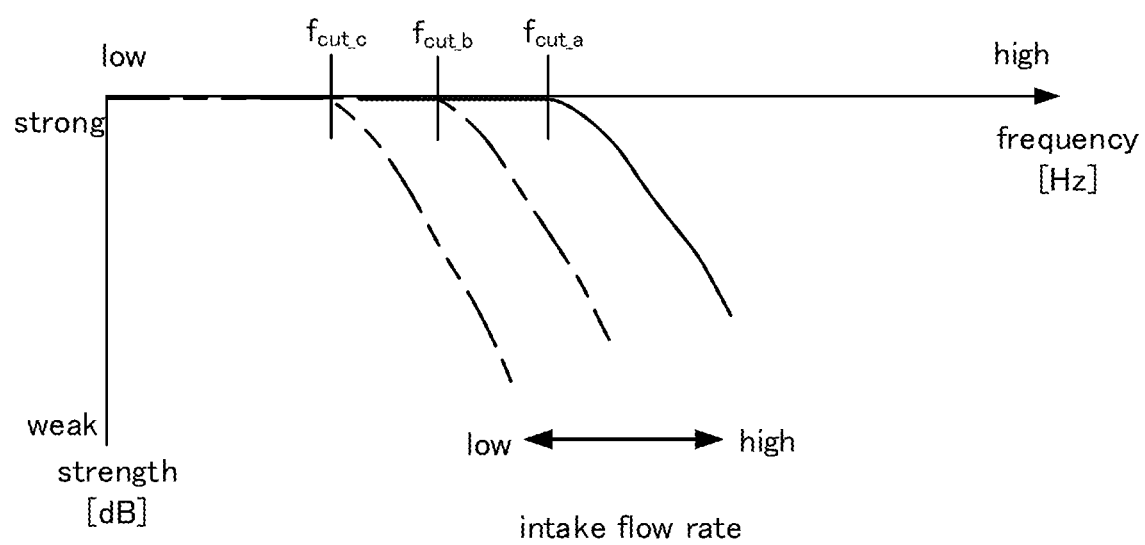
FIG. 3 is a view illustrating transfer characteristics of a filter.

FIG. 3 is a view illustrating filtering characteristics of the transfer function of Formula (1). In this drawing, x-axis indicates frequency, and y-axis indicates output strength.

In the air-fuel ratio control unit 37, the illustrated three types of transfer functions are used in a switching manner, in response to the intake flow rate supplied to the engine 1. These three types of transfer functions are low pass filters that transmit signals of low frequency, and the higher the intake flow rate, the higher the cutoff frequency $f_{cut}$. This is caused by the delay from the input of the air-fuel ratio in the combustion chamber 2 of the engine 1 to the output of the air-fuel ratio measured value obtained by the air-fuel ratio sensor 21 being smaller with a higher intake flow rate.

In this drawing, among the characteristics indicated by the solid line, the long dashed short dashed line, and the long dashed double-short dashed line, the one with the maximum intake flow rate is indicated by the solid line, and the one with the minimum intake flow rate is indicated by the long dashed double-short dashed line. The cutoff frequency $f_{cut\_a}$ in the case of the maximum intake flow rate is the greatest, and as the intake flow rate decreases, the cutoff frequency decreases in the order of the cutoff frequency $f_{cut\_b}$, the cut-off frequency $f_{cut\_c}$.

Moreover, in the plant, signals of frequencies higher than the cutoff frequency that cannot be represented by a transfer function cannot be modeled, and hence can be deemed as noise. As described above, by using the transfer function in the case in which the intake flow rate is maximum and in which the cut-off frequency $f_{cut\_a}$ is maximum as the filter 36, it is possible to efficiently hold down the noise that may occur in the plant.

Figure 4:
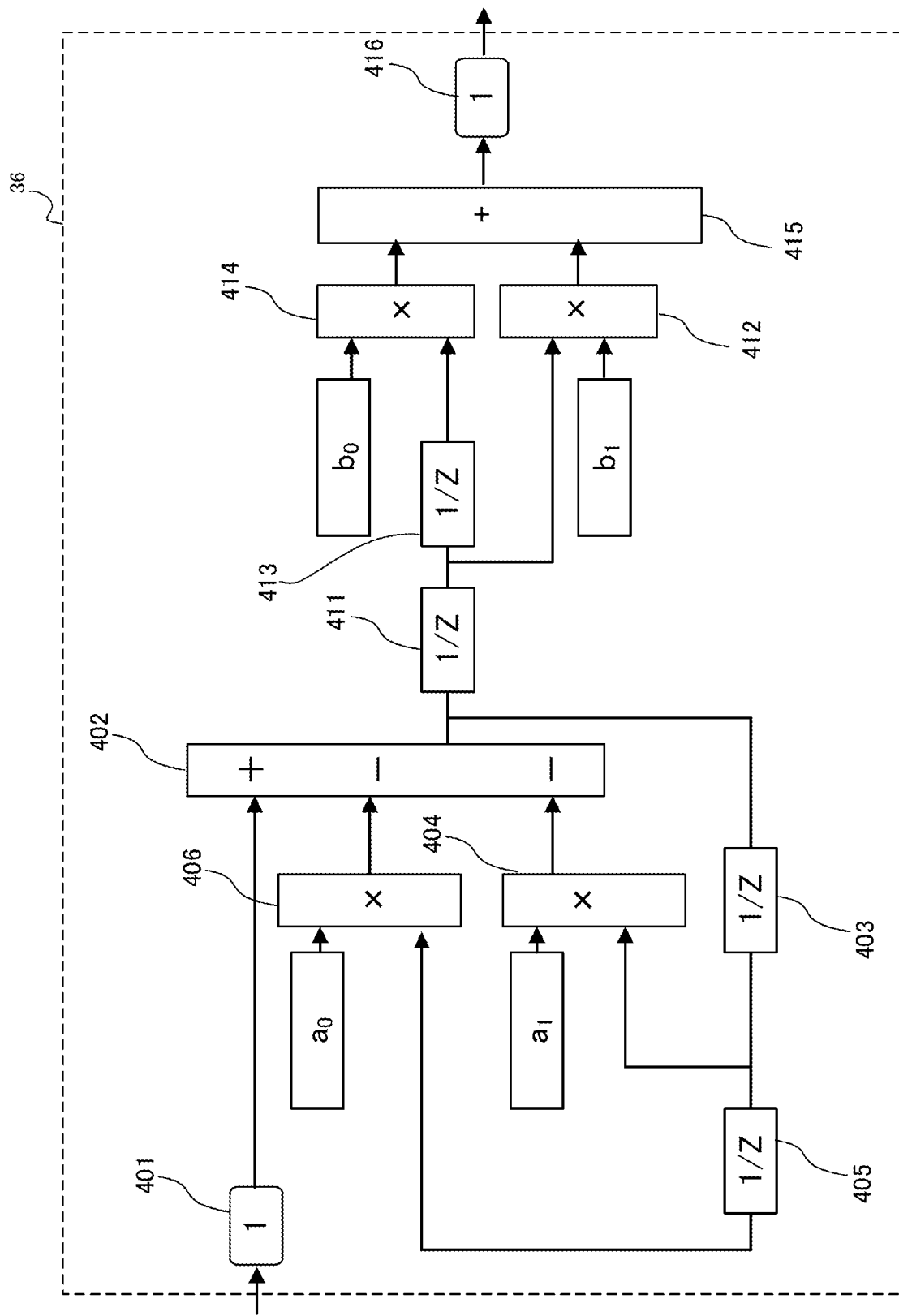
FIG. 4 is a system configuration illustrating a transfer function.

FIG. 4 is a system configuration diagram of the filter 36. In this drawing, a discretized system is illustrated for the transfer function of Formula (1).

In the system of this drawing, a value inputted to block 401 is outputted from the block 416 in the end upon undergoing an internal process of the filter 36. In the blocks 401 to 406 in the first half, a denominator part in the transfer function $(1/(1+a_1 z^{-1}+a_0 z^{-2}))$ is processed, and in the blocks 411 to 416 in the second half, a numerator part in the transfer function $(b_1 z^{-1}+b_0 z^{-2})$ is processed. Furthermore, in the filter 36, both are connected in series; once an input is received at block 401, a value having been undergone the filter processing is outputted from the block 416 in the end.

In the first half, a primary delay component is obtained by an output from the block 402 undergoing the delay block 403, and by multiplying $a_1$ to this primary delay component by the block 404, a primary delay feedback component is obtained. Furthermore, with respect to the output from the block 402, a secondary delay component is obtained by undergoing the delay blocks 403 and 405, and by multiplying $a_0$ by the block 406 with respect to this secondary delay component, a secondary delay feedback component is obtained. Furthermore, in the block 402, the primary delay feedback component obtained by the block 404 and the secondary delay feedback component obtained by the block 405 are subtracted from the input value from the air-fuel ratio sensor 21, to obtain the denominator part of the transfer function.

In the second half, the primary delay component is obtained by the output from the block 402 undergoing the delay block 411, and the primary delay feedback component is obtained by multiplying $b_1$ by the block 412 with respect to this primary delay component. Furthermore, the secondary delay component is obtained by the output from the block 402 undergoing the delay blocks 411 and 413, and the secondary delay feedback component is obtained by multiplying $b_0$ by the block 414 with respect to this secondary delay component. Furthermore, in the block 415, the primary delay feedback component obtained by the block 412 and the secondary delay feedback component obtained by the block 414 are added together, to find the numerator part of the transfer function.

As such, the system illustrated in this drawing connects in series the denominator part of Formula (1) by the blocks 401 to 406 of the first half, and the numerator part of Formula (1) by the blocks 411 to 416 of the second half. This system is one discretizing the transfer function of Formula (1), and is equivalent to the transfer function of Formula (1).

Figure 5A:
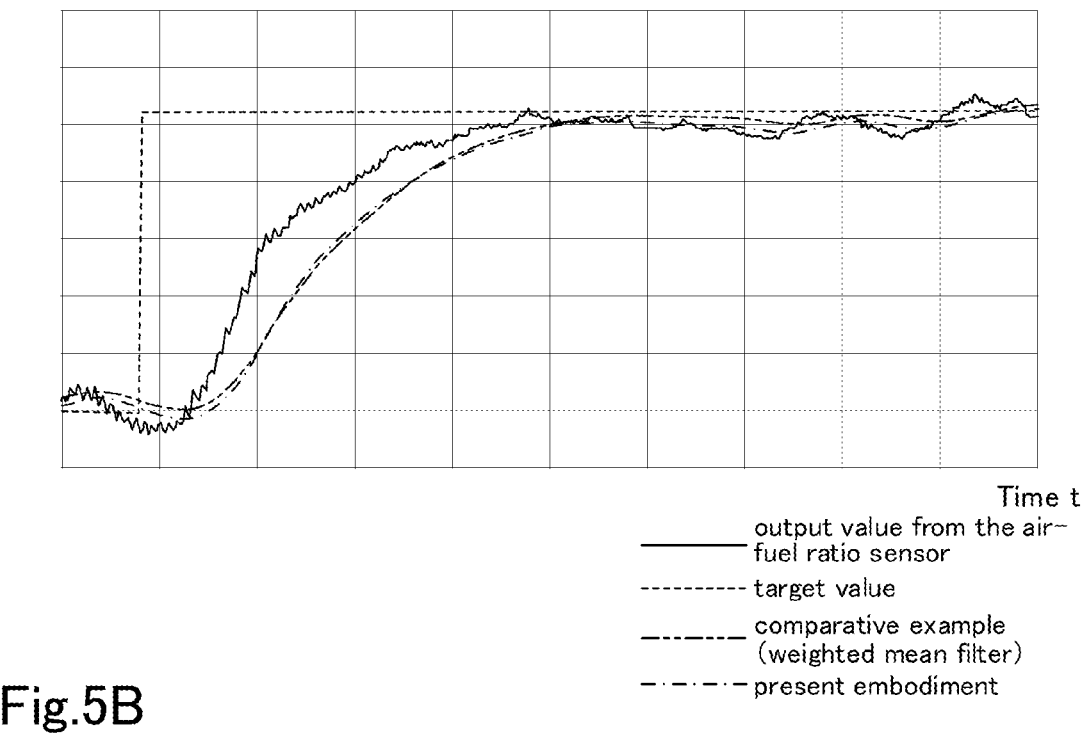
FIG. 5A is a graph illustrating a time variation of the air-fuel ratio.
Figure 5B:
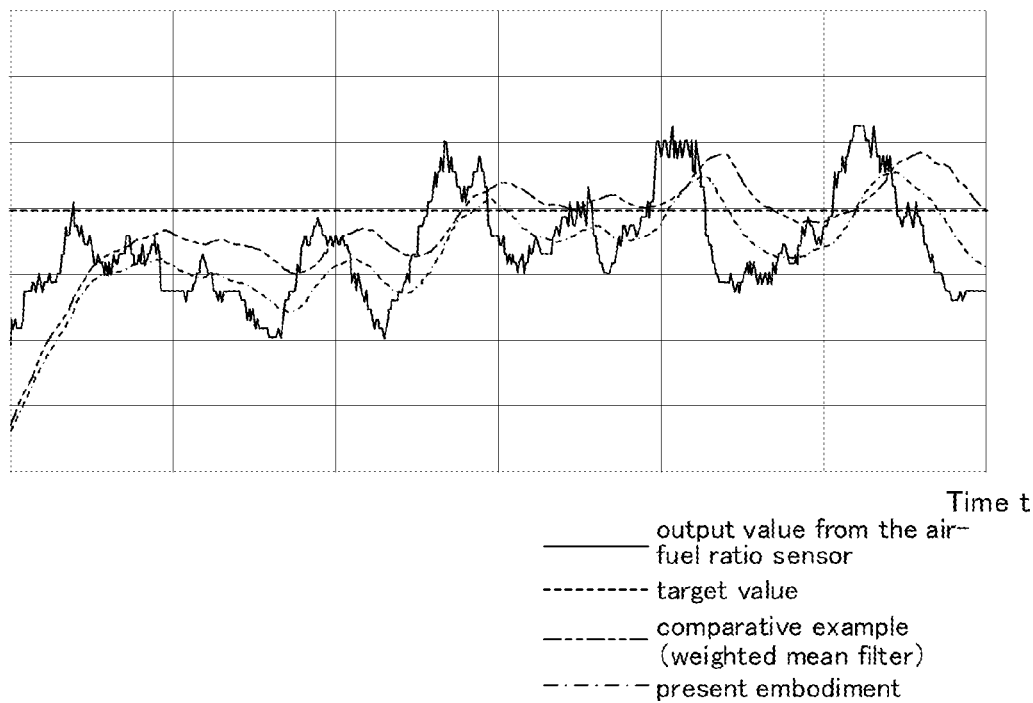
FIG. 5B is a graph illustrating a time variation of the air-fuel ratio.

FIGS. 5A, 5B are views illustrating timing charts of the present embodiment and a comparative example.

FIG. 5A is a timing chart of the air-fuel ratio in a case in which the fuel is injected and the air-fuel ratio changes stepwise. FIG. 5B is a timing chart of the air-fuel ratio upon convergence to the target value in a case in which a control similar to FIG. 5A is performed. In these drawings, the air-fuel ratio measured value obtained by the air-fuel ratio sensor 21 is illustrated as the solid line, and the target value is illustrated as the dotted line. Furthermore, an output value from the filter 36 of Formula (1) of the present embodiment is illustrated as a long dashed short dashed line, and an output value in a case in which a weighted mean filter is used as the filter 36 is illustrated as a long dashed double short dashed line.

As illustrated in FIG. 5A, the filter 36 of Formula (1) of the present embodiment has a similar degree of conformability with respect to the output value from the air-fuel ratio sensor 21 upon comparing with the case in which the weighted mean filter is used in the comparative example. Moreover, as illustrated in FIG. 5B, the value obtained by using the filter 36 configured of Formula (1) of the present embodiment is held down in high frequency noise included in the output from the air-fuel ratio sensor 21. Furthermore, the value obtained by using the filter 36 of the present embodiment is smaller in difference with the output value from the air-fuel ratio sensor 21 overall, than the comparative example.

As such, the filter 36 of Formula (1) of the present embodiment has a performance of a similar degree as the weighted mean filter in the comparative example. Furthermore, the transfer function used in the air-fuel ratio control unit 37 is utilized for the filter 36, hence it is possible to hold down development manhour.

In the present embodiment, in the feedback control by the air-fuel ratio control unit 37, a transfer function illustrated in Formula (1) that models the plant is used, and the transfer function illustrated in Formula (1) was utilized in the filter 36, however it is not to this. In the filter 36, the transfer function illustrated in Formula (1) is used, and the feedback control of the air-fuel ratio control unit 37 may use a transfer function other than that of Formula (1).

According to the present embodiment, the following effects can be achieved.

According to the engine system 100 of the present embodiment, in the air-fuel ratio control unit 37 in the controller 30, the feedback control is performed by using a transfer function obtained by system identification of a plant having the air-fuel ratio in the combustion chamber 2 serve as the input and the air-fuel ratio measured value obtained by the air-fuel ratio sensor 21 serve as the output. Furthermore, a low pass filter equivalent to the transfer function is used as the filter 36.

This transfer function represents a delay in detection of the air-fuel ratio in the plant; hence the output that has passed through the transfer function includes just the frequency acquirable by the air-fuel ratio sensor 21. Therefore, by using the transfer function in the filter 36 as the low pass filter, it is possible to cut the high frequency noise impossible to respond in the plant.

Furthermore, the feedback control is performed in the air-fuel ratio control portion 37, and in this feedback control, a transfer function that can be achieved by system identifying the plant is used. Therefore, the transfer function used in the feedback control in the air-fuel ratio control portion 37 may be utilized in the filter 36. As a result, no additional steps are necessary to design the filter 36, and allows for reducing the entire number of developing steps.

According to the engine system 100 of the present embodiment, as illustrated in FIG. 3, the greater the intake flow rate, the greater the cutoff frequency of the transfer function being the low pass filter. On this account, by using the filter 36 obtained by the system identification in the plant in the case in which the intake flow rate is maximum, a signal of a higher frequency will transmit through the filter 36.

In order to design a filter that separates noise from a signal outputted from the plant, it is necessary to have a maximum frequency that can respond in the plant to pass through as a necessary signal. On this account, by using the transfer function in the case in which the intake flow rate is maximum for the filter 36, a signal having a higher frequency passes through the filter 36, hence allowing for efficiently holding down noise.

According to the engine system 100 of the present embodiment, the sliding mode control is used for the feedback control in the air-fuel ratio control unit 37. The sliding mode control is high in durability, and can perform system identification relatively easily by a calculator. Therefore, the system identification of the plant in the case in which the sliding mode control is rendered can be performed by the calculator; hence, reduction effect in the developing manhour increases.

According to the engine system 100 of the present embodiment, the filter 36 is one discretizing the transfer function used in the feedback control in the air-fuel ratio control unit 37. By using the discretized transfer function for the filter 36, the sampling cycle of the input to the air-fuel ratio control unit 37 can be varied. Therefore, by varying the sampling cycle, it is possible to accomplish the engine system 100 including both stability and immediacy in feedback control.

The above describes an embodiment of the present invention, however the above embodiment merely illustrates one portion of an application example of the present invention, and does not intend to limit the technical range of the present invention to the specific configurations in the above embodiment.

The invention claimed is:

1. A control method of an engine system, the engine system comprising:
   an engine with a combustion chamber;
   a fuel injection valve configured to supply fuel to the engine; and
   an air-fuel ratio sensor provided in a flow path of exhaust gas from the engine,
   the control method of the engine system performing feedback control such that that an air-fuel ratio in the combustion chamber becomes a target value by controlling the fuel injection valve, using an air-fuel ratio measured value obtained by the air-fuel ratio sensor,
   wherein in the feedback control, a transfer function indicated by the following formula (1) is used:

$$G(z) = \frac{b_1 z^{-1} + b_0 z^{-2}}{1 + a_1 z^{-1} + a_0 z^{-2}} \quad (1)$$

wherein in Formula (1), G(z) is the transfer function, and $a_0$, $a_1$, $b_0$, and $b_1$ are parameters defined by system identification of a plant, the transfer function being obtained by the system identification of the plant in which the air-fuel ratio in the combustion chamber serves as an input and the air-fuel ratio measured value obtained by the air-fuel ratio sensor serves as an output, and
   wherein a filtering process is performed to an air-fuel ratio measured value used in the feedback control using a low pass filter obtained by discretizing the transfer function.

2. The control method of an engine system according to claim 1, wherein
   the feedback control is performed on the basis of a sliding mode control.

3. An engine system comprising:
an engine with a combustion chamber;
a fuel injection valve configured to supply fuel to the engine;
an air-fuel ratio sensor provided in a flow path of exhaust gas from the engine; and
a controller configured to perform feedback control such that an air-fuel ratio in the combustion chamber becomes a target value by controlling the fuel injection valve, using an air-fuel ratio measured value obtained by the air-fuel ratio sensor,
wherein in the controller, a transfer function indicated by the following formula (2) is used:

$$G(z) = \frac{b_1 z^{-1} + b_0 z^{-2}}{1 + a_1 z^{-1} + a_0 z^{-2}} \quad (2)$$

wherein in Formula (2), G(z) is the transfer function, and $a_0$, $a_1$, $b_0$, and $b_1$ are parameters defined by system identification of a plant, the transfer function being obtained by the system identification of the plant in which the air-fuel ratio in the combustion chamber serves as an input and the air-fuel ratio measured value obtained by the air-fuel ratio sensor serves as an output, and
wherein a filtering process is performed to an air-fuel ratio measured value used in the feedback control using a low pass filter obtained by discretizing the transfer function.

\* \* \* \* \*